L. R. EVANS.
CLAMPING DEVICE.
APPLICATION FILED FEB. 10, 1916.

1,259,219.

Patented Mar. 12, 1918.

INVENTOR
Leigh R. Evans
BY
Lyman E. Dodge
ATTORNEY

UNITED STATES PATENT OFFICE.

LEIGH R. EVANS, OF ROCHESTER, NEW YORK.

CLAMPING DEVICE.

1,259,219.   Specification of Letters Patent.   Patented Mar. 12, 1918.

Application filed February 10, 1916. Serial No. 77,422.

*To all whom it may concern:*

Be it known that I, LEIGH R. EVANS, a citizen of the United States, and a resident of the city of Rochester, in the county of Monroe and State of New York, have invented a new and useful Clamping Device, of which the following is a specification.

This invention relates to supports or clamping devices, and more particularly to clamping devices for attaching heavy bodies which are subjected to vibration to tubes or bars.

One of the objects of this invention is to devise a novel and simple clamping device for attaching bodies having a comparatively large weight to tubes or bars, which can be easily and quickly attached and detached, and which will have the least tendency to break the tubes or bars.

Other objects and advantages of the invention will appear more fully hereinafter as the description progresses, and the novel features of the invention are pointed out in the appended claims.

Figure 1:
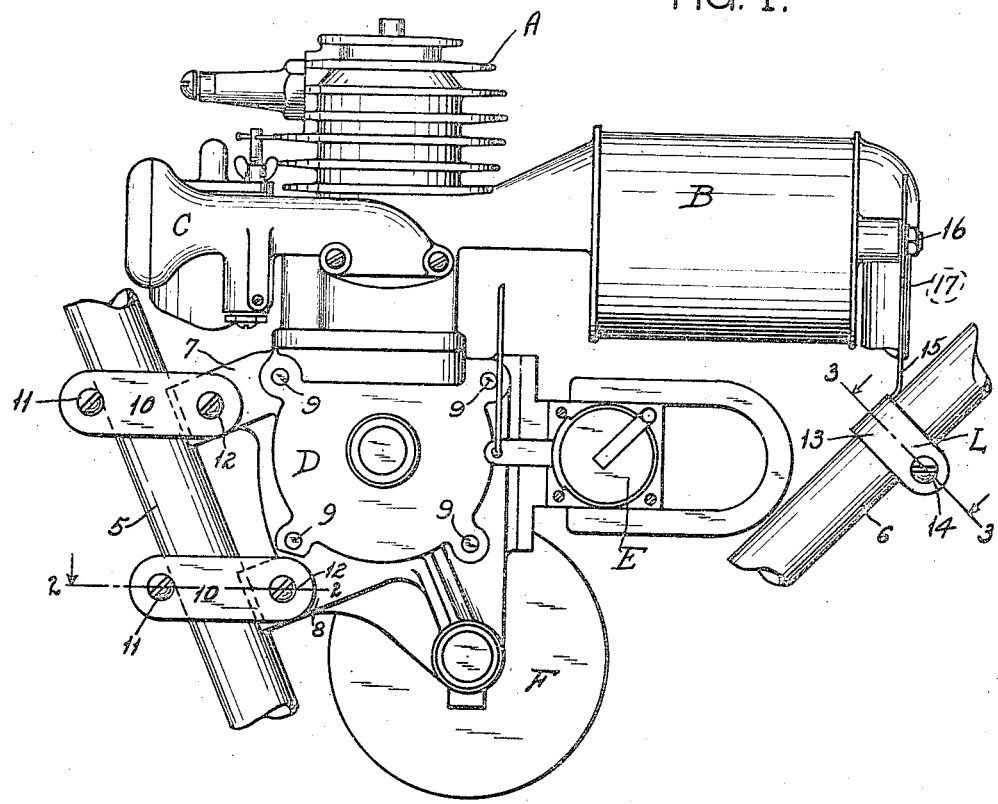
Figure 2:
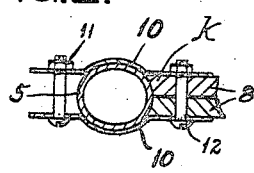
Figure 3:
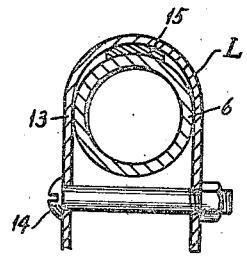

In the accompanying drawing which shows one physical embodiment of the invention and an application thereof, and in which the same reference characters refer to like parts in the several views, Figure 1 shows a clamping device embodying the invention used for attaching a motor to the frame of a bicycle; Fig. 2 is a cross section taken on the line 2—2 in Fig. 1; and Fig. 3 is a cross section taken on the line 3—3 in Fig. 1.

In the accompanying drawing I have illustrated clamping devices embodying my invention as used for attaching a motor to the frame of a bicycle since this application illustrates very well the characteristics and features of my invention. The motor may be of any ordinary or suitable construction, but is shown as a light unitary structure specially adapted for attachment to the frame of an ordinary bicycle to convert such a bicycle into a motorcycle. The motor shown comprises a cylinder A, a muffler B, a carbureter C, a crank case D, a magneto E, and a driving pulley F, which is designed to be connected by a belt to the rear wheel of the bicycle (not shown). This motor is supported by and fastened to tubes 5 and 6, which will be readily recognized as the front and rear inclined tubes of the well known diamond-shaped bicycle frame.

Integral with the crank case D of the motor are two lugs 7 and 8, the outer ends of which are preferably slightly concave, as shown in Fig. 2, to conform to the curvature of the tube 5, these lugs 7 and 8 being shown as consisting of two parts because the crank case D is preferably made of two parts or halves fastened together by bolts 9. These lugs 7 and 8 are attached to the rear tube 5 by clamps K which are the same in construction. Each clamp K comprises two counterpart strap-like members 10 bowed outwardly between their ends to fit partway around the tube 5, and have alined holes in each end adapted to receive bolts 11 and 12 which serve to clamp the members 10 to the tube 5. The bolt 12 passes through a hole in the corresponding lug 7 or 8, as the case may be, while the bolt 11 extends crosswise of the tube 5 on the side opposite from the crank case D. By tightening the bolt 11 the two members 10 of each clamp K may be drawn together and pressed tightly enough against the tube 5 to prevent them from slipping on said tube. These members 10 are preferably made of a material which is slightly resilient so that their resiliency prevents the nuts of the bolts 11 and 12 from working loose. Also, these members 10, instead of extending at right angles to the axis of the tube 5, are arranged to extend obliquely of said axis; and this oblique position of the members 10 on the tube 5 forms a very important feature of this invention. I have found by experiment in attempting to attach a motor to the frame of a bicycle that when the clamping members, as 10, extend at right angles to the axis of the tube of the frame, this tube is subjected to such severe localized stresses that it soon breaks in service. On the other hand, when the motor is attached to the tube, as 5, of a bicycle frame by clamping members disposed obliquely to the axis of said tube, as shown in Fig. 1, the exact angle being immaterial, I have found by actual trial that the tube 5 will not break under the same conditions and usage which would cause a like tube to break if these clamping members extended at right angles to the axis of the tube. I attribute this difference to the fact that severe vibrations are produced in the tube 5 by the weight and inertia of the motor as the bicycle travels over irregularities in the road; and that by arranging the clamping members 10 so that they extend obliquely across the tube 5, the effect of these vibrations on the tube 5 is reduced.

From the foregoing it can be seen that the two clamps K constitute a simple means for detachably connecting a heavy body, such as a motor, to a tube or bar, such as the tube 5; and that the construction and arrangement of these clamps K is such as to reduce the tendency of the heavy body to break the tube or bar, especially when the body, the tube, or both are subjected to vibration.

In some cases it is found expedient to support a heavy body by two tubes or bars, such a case being exemplified in the construction illustrated in the accompanying drawing where a motor is attached to the two tubes 5 and 6 of the frame of an ordinary bicycle; and in such cases considerable difficulty is encountered by reason of the fact that the tubes or bars break after a short time when the heavy body is rigidly clamped or attached to both of the tubes or bars and the whole structure is subjected to vibration. Referring to the particular case illustrated, I have found that in order to avoid this difficulty it is necessary to support the motor principally by one of the two tubes, preferably the rear tube 5, and to connect the motor to the other or front tube 6 by a yielding connection, which, while it does not rigidly tie the two tubes 5 and 6 together, braces the motor and holds it better in place between the two tubes.

In the embodiment of my invention shown in the accompanying drawing, the yielding connection above mentioned is afforded by the clamp L which comprises a U-shaped member 13, preferably bent from a piece of resilient sheet metal and clamped to the tube 6 by a bolt 14, and another member 15, which is also preferably made from a strip of resilient sheet metal and is suitably fastened to the member 13 between its ends, as by being welded thereto, and which is fastened to the muffler B or other rigid part of the motor by a bolt 16, a number of holes 17 for the bolt 16 being made in the member 15 to provide for adjustment and to facilitate the attachment of the motor to bicycle frames of different dimensions. It is apparent that the member 15 may bend and does not attach the motor rigidly to the front tube 6. I have found that it is important that the member 15 should not have any sharp or abrupt bends in it, otherwise it is quite likely to break at these bends. It should also be noted that it is not essential that the clamping member 13 should extend obliquely across the tube 6, since the connection between said member 13 and the motor is not rigid.

I have illustrated the preferred embodiments of my invention as constructed and arranged for attaching a motor to the frame of a bicycle, but it is obvious that the same construction and arrangement, or other constructions and arrangements involving the same characteristics and principles of action, could be used for various other purposes, without departing from my invention, and I do not wish to be restricted to the details of the constructions illustrated or the particular application thereof shown and described.

What I claim is:

1. In a clamping device for attaching a motor to a bicycle frame, the combination with rear and front tubes of a motor to be attached to said tubes, means for rigidly clamping said motor to the rear tube, and means for resiliently connecting said motor to the other of said tubes.

2. In a clamping device for attaching a motor to a bicycle frame, in combination with the two substantially upright tubes of a bicycle frame and a motor, of a clamp for attaching the motor to one of the tubes which grips that tube along a line extending obliquely to the axis thereof, and means for resiliently connecting the motor to the other of the tubes.

3. In a clamping device for attaching a motor to a bicycle frame, in combination with the two substantially upright tubes of a bicycle frame and a motor, of a detachable split clamp for attaching the motor to one of said tubes, said clamp extending crosswise of said tube and obliquely to the axis thereof, means for clamping said clamp to said tube, another clamping member secured to said motor and resilient in the plane of said tubes, and means for clamping said clamping member to the other of the tubes.

4. In a clamping device for attaching a motor to a bicycle frame, in combination with the two upright tubes of a bicycle frame and a motor, of means for rigidly connecting said motor to one of said tubes, a resilient member disposed in the plane of said tubes and secured at one end to the motor and clamped at its other end to the other of said tubes.

LEIGH R. EVANS.